(12) United States Patent
Zhang et al.

(10) Patent No.: US 9,625,611 B2
(45) Date of Patent: Apr. 18, 2017

(54) METHOD FOR DETECTING ZONAL UNDERGROUND TARGET IN MOUNTAIN LAND BASED ON RIDGE HEAT RADIATION CORRECTION

(71) Applicant: HUAZHONG UNIVERSITY OF SCIENCE AND TECHNOLOGY, Wuhan, Hubei (CN)

(72) Inventors: Tianxu Zhang, Hubei (CN); Cen Lu, Hubei (CN); Yuehuan Wang, Hubei (CN); Weidong Yang, Hubei (CN); Nong Sang, Hubei (CN); Wenxuan Ma, Hubei (CN); Longwei Hao, Hubei (CN)

(73) Assignee: Huazhong University of Science and Technology, Wuhan, Hubei (CN)

( * ) Notice: Subject to any disclaimer, the term of this patent is extended or adjusted under 35 U.S.C. 154(b) by 0 days.

(21) Appl. No.: 15/114,651

(22) PCT Filed: Feb. 10, 2015

(86) PCT No.: PCT/CN2015/072680
§ 371 (c)(1),
(2) Date: Jul. 27, 2016

(87) PCT Pub. No.: WO2016/106958
PCT Pub. Date: Jul. 7, 2016

(65) Prior Publication Data
US 2016/0356920 A1    Dec. 8, 2016

(30) Foreign Application Priority Data
Dec. 30, 2014   (CN) .......................... 2014 1 0851352

(51) Int. Cl.
*G01V 9/00*  (2006.01)
*G01C 21/00* (2006.01)
*G06K 9/00*  (2006.01)

(52) U.S. Cl.
CPC ........... *G01V 9/005* (2013.01); *G01C 21/005* (2013.01); *G06K 9/00* (2013.01)

(58) Field of Classification Search
None
See application file for complete search history.

(56) References Cited

U.S. PATENT DOCUMENTS 5,086,396 A  *  2/1992  Waruszewski, Jr. .... F41G 7/343
                                                      701/300
9,430,862 B2 *  8/2016  Chiba ................ H04N 13/0257
(Continued)

FOREIGN PATENT DOCUMENTS

| CN | 102567702 | 7/2012 |
|----|-----------|--------|
| CN | 103148842 | 6/2013 |

(Continued)

OTHER PUBLICATIONS

International Search Report for international application No. PCT/CN2015/072680. dated Sep. 17, 2015 (4 pages, including English translation).

*Primary Examiner* — Matthew Bella
*Assistant Examiner* — Soo Shin
(74) *Attorney, Agent, or Firm* — Hamre, Schumann, Mueller & Larson, P.C.

(57) ABSTRACT

The present invention discloses a method for detecting, recognizing, and positioning a zonal underground target in a mountain land environment by detecting a ridge position in the mountain land environment and carrying out energy correction. The method belongs to the interdisciplinary field of pattern recognition, remote sensing technology and terrain analysis. The zonal underground target can cause energy abnormity when the heat field thereof is different from that of a mountain mass, and the heat island effect of the ridge can also cause the energy of the mountain mass to be abnormal. However, the energy abnormity caused by the heat island effect is essentially different from the energy abnormity caused by the zonal underground target in the aspect of mode. Therefore, the present invention aims to achieve an effect of reducing a false alarm rate of detecting and recognizing a zonal underground target in the mountain land environment by eliminating the influence of the heat (Continued)

body effect generated by the ridge in the terrain on the weak energy abnormity mode presented by the zonal underground target. The present invention comprises steps of acquiring digital elevation information of terrain, performing de-noising pretreatment on the digital elevation information, detecting a ridge line, correcting energy at the ridge position, and detecting the zonal underground target.

10 Claims, 9 Drawing Sheets

(56) References Cited

U.S. PATENT DOCUMENTS

| | | | | |
|---|---|---|---|---|
| 2003/0023412 A1* | 1/2003 | Rappaport | ............ | H04W 16/20 703/1 |
| 2006/0262117 A1* | 11/2006 | Chiba | .................... | G09B 29/12 345/440 |

FOREIGN PATENT DOCUMENTS

| CN | 103177258 | 6/2013 |
|---|---|---|
| CN | 103745191 | 4/2014 |

* cited by examiner

METHOD FOR DETECTING ZONAL UNDERGROUND TARGET IN MOUNTAIN LAND BASED ON RIDGE HEAT RADIATION CORRECTION

TECHNICAL FIELD

The present invention belongs to the interdisciplinary field of pattern recognition, remote sensing technology, and terrain analysis, and in particular, relates to a method for detecting a zonal underground target in mountain land based on ridge heat radiation correction, where the method improves the correct rate of detecting the underground target in a mountain land environment and meanwhile reduces a false alarm rate by positioning a ridge position through terrain analysis and correcting ridge heat radiation.

BACKGROUND

Generally, there are a large quantity of zonal targets in a mountain land environment, for example, underground rivers that exist in the natural environment, and man-made underground petroleum pipelines, and railway and road tunnels that pass through mountains. The underground rivers are important water resources on one hand, and on the other hand, need to be avoided during construction in mountain land. Therefore, how to accurately detect and position an underground river has great significance for both our sustainable development and modernization progress. Road tunnels and railway tunnels can pass through mountains, which not only greatly shortens the road length and reduces time people spend on travel, but also saves a lot of manpower and material resources for constructing winding mountain roads and railways. Moreover, for automobiles, tunnels are much safer than winding mountain roads. However, once these man-made underground constructions in the mountain land environment become malfunctioning, it is difficult to detect the position where the malfunction occurs. Therefore, to accurately detect and position these underground zonal targets has significant influence on various aspects of people's transportation and life. Therefore, it is necessary to carry out study on detection and positioning of a zonal underground target in a mountain land environment with a relatively low false alarm rate and a relatively high recognition rate.

Certainly, contact type artificial detection is the commonest and most direct method for detecting tunnel facilities. However, this method is very time-consuming and needs a lot of manpower and material resources. Although infrared imaging is put forward as a new technology for detecting zonal underground targets and is applied to detection of shallow underground pipelines, the application of infrared imaging in detecting deeply buried zonal underground targets has not been reported home and abroad.

Soils and rocks absorb solar energy and generate heat, and the heat, in the form of infrared radiation, is detected by an infrared sensor. The heat field of the mountain mass generally includes a stable part and a variable part, where the variable part is the shallow mountain mass of which the temperature changes drastically under the effect of sunlight, and the stable part includes the mountain mass below the shallow mountain mass and an underground target buried therein. The sun cyclically heats the variable part of the mountain mass every day. Heat exchange between the stable part and the variable part inside the mountain mass and exchange of heat generated by the underground target itself and heat of the stable part finally cause a detectable temperature difference between the temperature of the mountain mass and the temperature of the buried target, and this temperature difference is the physical basis for detecting the underground target.

The temperature and energy of a zonal underground target are different from those of surrounding mountain mass media, and finally present a blurred Gaussian-like pulse mode (positive or negative) in the mountain mass after heat transmission and diffusion. However, due to the heat island effect of the ridge, the energy field at the ridge position also conforms to the blurred Gaussian-like pulse mode (positive or negative), which causes interference to the detection of the zonal underground target in mountain land.

SUMMARY

In view of the defect that a method for detecting a zonal underground target in a mountain land environment by using a blurred Gaussian-like pulse mode (positive or negative) is usually accompanied with a relatively high false alarm rate due the influence of the heat island effect of the ridge, the present invention provides a method for detecting and positioning a zonal underground target, in which a ridge position is determined by using a ridge line detection algorithm, ridge heat radiation is corrected, and then the zonal underground target is detected and positioned by using an energy image after correction, thereby solving the problem of the high false alarm rate caused by the ridge in the mountain land environment. The method for detecting a zonal target in mountain land based on ridge heat radiation correction in the present invention mainly includes steps of:

(1) acquiring digital elevation information of terrain, including sub-steps of:

(1.1) determining the longitudes and latitudes of coverage of the digital elevation information:

Soil and air environment are homogeneous in a certain range. First of all, we should determine the range of the terrain within which the digital elevation information needs to be obtained, and determine the position of the detected range, that is, longitude and latitude information. Because longitude and latitude information of each point further needs to be determined in the following step, we'd better determine a standard rectangular region. Herein, only longitude and latitude information of four vertices of the rectangle needs to be determined, respectively marked as Pt1 (longti1, lati1), Pt2 (longti2, lati2), Pt3 (longti3, lati3), and Pt4 (longti4, lati4).

(1.2) calculating a longitude-latitude array in the coverage:

The resolution of the longitude-latitude array needs to be the same as that of an energy (infrared) image, so that the finally obtained digital elevation information of the terrain can correspond to the energy (infrared) image, so as to detect the ridge position by using the digital elevation information of the terrain and finally find a position where the ridge is located on the corresponding energy (infrared) image.

(1.2.1) calculating the width and height of a terrain range:

calculating, according to the longitudes and latitudes of the four vertices of the rectangle determined in (1.1), the width and height of the rectangular coverage by using a distance measuring tool provided by Google Earth, the calculated width and height being marked as width and height in meters, and calculating the range of the longitudes and latitudes.

(1.2.2) calculating the longitude-latitude array:

sampling at intervals of step meters according to a sampling interval of step meters, to respectively calculate the number of sampling points in the vertical direction and the number of sampling points in the horizontal direction, that is: height/step and width/step, and calculating a longitude step long_step and a latitude step lati_step between every two neighboring sampling points in the longitude-latitude array, thereby calculating the longitude and latitude of each sampling point in the longitude-latitude array.

(1.3) calculating an elevation array by using Google Earth:

Google Earth provides a programming interface, which allows us to input the longitude-latitude array in (1.2.2) to Google Earth, to obtain elevation data of each sampling point; and a digital elevation information array of the terrain is generated according to the elevation data and output.

(2) performing de-noising pretreatment on the digital elevation information, including sub-steps as below:

The digital elevation information array obtained in (1.3) may carry certain noise, where the noise may be caused by inaccurate elevation data or a higher or lower height of an entire block when Google Earth stitches images. The higher or lower height of the entire block does not affect detection of the ridge line, and therefore, for individual noise caused by inaccurate elevation data, we use a mean filtering method to perform de-noising pretreatment on the original digital elevation information of the terrain. That is, a mean value of elevation information in a certain local range, for example, in a k*k neighborhood, is used as an output. In this way, the influence of the randomly distributed noise can be eliminated. Assuming that an actual elevation value of the $i^{th}$ sampling point in a neighborhood is $h_i$, a noise error of the sampling point is $\Delta h_i$, and a finally observed value is $h+\Delta h_i$, a process of using a mean value of pixels in a neighborhood as an output is as follows:

$$\frac{1}{n}\sum_{i=1}^{n}(h_i + \Delta h_i) = \frac{1}{n}\sum_{i=1}^{n}h_i + \frac{1}{n}\sum_{i=1}^{n}\Delta h_i$$

$$\approx \frac{1}{n}\sum_{i=1}^{n}h_i$$

that is, as the noise is randomly distributed, average noise of multiple sampling points is 0, and in this way, an elevation map that approximates an actual condition can be obtained.

(3) detecting a ridge line, including sub-steps of:

(3.1) detecting a ridge line along the horizontal direction:

The ridge line along the horizontal direction is the ridge line along an x direction. Traversing is performed along the x direction, to compare an elevation value of each sampling point with elevation values of sampling points in a certain range (for example, in a range of 5 sampling points, that is, 50 meters) in a y direction, where if the sampling point has a maximum value in the y direction, it is considered that the point is a candidate point of the ridge line along the horizontal direction; the certain range may be set in advance.

(3.2) detecting a ridge line along the vertical direction:

The ridge line along the vertical direction is the ridge line along a y direction. Traversing is performed along the y direction, to compare an elevation value of each sampling point with elevation values of sampling points in a certain range (for example, in a range of 5 sampling points, that is, 50 meters) in an x direction, where if the sampling point has a maximum value in the x direction, it is considered that the point is a candidate point of the ridge line along the vertical direction; the certain range may be set in advance.

(3.3) extracting a continuous ridge line:

A normal ridge line point should be continuous rather than being isolate. However, ridge line candidate points extracted according to step (3.1) and step (3.2) may be isolate points that are not continuous. Therefore, we should judge the continuity of each ridge line candidate point. A criterion for the judgment is as follows: if a total number of ridge line candidate points in a neighborhood t*t of the ridge line candidate point is greater than th_num, the ridge line candidate point is a final ridge line point; otherwise, it is judged that the isolate ridge line candidate point is a non-ridge line point, where t is a preset value. In this way, a final continuous ridge line mark map can be obtained.

(4) correcting energy at the ridge position, including sub-steps of:

(4.1) analyzing an energy distribution feature at the ridge position:

The ridge position generally has the mountain mass effect, which mainly refers to the thermal effect of uplift land. The mountain mass creates the surrounding climate, and at any given elevation, as a surface area of the uplift land increases, the mountain mass has greater influence on itself and the surrounding environment. As an uplift heat island, the mountain mass absorbs solar radiation and converts the radiation into long-wave heat energy, and has a temperature much higher than free atmosphere at the same elevation.

On the other hand, according to the analysis from the perspective of the heat transfer theory, heat always travels along the direction in which conduction occurs most readily. The heat conductivity of rocks in the mountain mass is 1.2 to 2.1 W/(m·° C.), while in comparison, the heat conductivity of external air in contact with the surface of the mountain mass is 0.024 W/(m·° C.). Therefore, when heat inside the mountain mass meets air, as the heat conductivity of the air is far less than the heat conductivity between rocks, most of the heat travels along the rocks and gathers at the ridge, generating such an energy distribution feature that heat at the ridge is obviously higher.

(4.2) correcting energy at the ridge position:

The energy at the ridge position is corrected according to the energy distribution feature at the ridge position illustrated in (4.1), where a specific correction method is: replacing energy of a sampling point on the ridge line with a mean value of energy of sampling points on two sides of the ridge line. By correcting energy at the ridge position, the detection and recognition false alarms can be effectively reduced.

(5) detecting the zonal underground target, including sub-steps of:

(5.1) setting parameters used for detecting, by means of traversing, the zonal underground target:

An infrared image of a mountain land region in which the zonal underground target may exist is traversed to detect a position where a blurred Gaussian-like pulse mode (positive or negative) occurs, so as to detect a false alarm position while positioning the zonal underground target. Before the traversing and detection are started, the following parameters need to be set:

Size of a sampling section and spacing from a comparison section to a central section: suppose that a sampling section of a mountain land surface under which the zonal underground target is assumed to exist has a length of 1 pixels and a width of w pixels, and then sampling sections of mountain land surfaces on two sides of the zonal underground target also have the same length and width. A distance from the center of either of the sampling sections of the mountain land surfaces on two sides to the center of the sampling section above the zonal underground target is s pixels, where 1, w, and s are preset values.

Search direction: The direction of the zonal underground target in this region can be roughly estimated by looking up related data, and central head and tail coordinates P0 (x0, y0) and P1 (x1, y1) for traversing and searching are set according to degree of the estimated direction, as long as a line connecting the two points passes through a position near the midpoint of this region, because in this way, it is convenient to move towards two sides for traversing and searching.

Distance for extension each time: Each time after one group of images of the mountain land surface under which the zonal underground target is assumed to exist and mountain land surfaces on two sides for comparison is searched, shift a distance of d towards two sides to continue to search a new group. Searching is stopped automatically when image boundaries are reached.

Pulse threshold: Only when absolute values of differences between an average gray value of each image sampling section, in the middle, of the mountain land surface under which the zonal underground target is assumed to exist and average gray values of image sampling sections of the mountain land surfaces on two sides for comparison are both greater than the pulse threshold th, a pulse at this position is counted as a valid pulse; and if either of the two differences is less than the pulse threshold, the pulse at this position is considered invalid due to a weak signal.

(5.2) Output a traversing and detection result:

moving the sampling section pixel by pixel from the point P0 (x0, y0) to the point P1 (x1, y1) starting from the central head and tail coordinates P0 (x0, y0) and P1 (x1, y1) for traversing and searching determined in (5.1), and each time after the sampling section is moved by one pixel, shifting to the left and right by r pixels respectively, finding a position at which the middle section has a maximum difference with the comparison sections on the left and right, and testing whether a pulse at this position is a valid pulse; if the pulse is a valid pulse, increasing the number of valid pulses by one; then calculating coordinates P0' and P1' that are obtained after P0 and P1 are shifted by the distance for extension each time towards two sides, making statistics between P0' and P1' by using a sampling method the same as that used between P0 and P1, and counting the number of valid pulses, where a position determined by a group of terminal coordinates P0 and P1, between which the number of valid pulses accounts for a largest proportion in the total number of pulses, is the position of the zonal underground target, and in the result, other positions where pulses appear are false alarm positions.

The technical effect of the present invention is as follows: It is found through study and experiments that in a mountain land environment, most false alarms in zonal underground target detection appear at the ridge position, and simulation of a mountain mass temperature field also proves the existence of the ridge effect. Therefore, we provide a method for detecting a zonal underground target in mountain land based on ridge heat radiation correction in which false alarms are reduced by detecting the ridge position and correcting energy at the ridge position. Test results show that this method can indeed significantly reduce false alarms at the ridge position during detection of zonal underground target in mountain land, so that the detection result is more accurate. Moreover, the method is easy to implement, involves a small amount of calculation, and requires less parameters.

BRIEF DESCRIPTION

DETAILED DESCRIPTION

In the present invention, a zonal underground target used to illustrate the method for detecting and recognizing a zonal underground target in a mountain land environment based on ridge heat radiation correction is a tunnel in the mountain land environment, and an energy image of a region where the tunnel is located is an infrared image that we obtain through simulation according to elevation information and infrared radiation characteristics of surface materials. When detection is performed by using algorithms in the present invention, a same effect can be obtained if the energy image mentioned in the present invention is replaced with a real infrared image.

The present invention provides, for the first time, a method for detecting a zonal underground target in mountain land by using an infrared imaging technology and multi-variate information, aiming at solving the problem of a high false alarm rate during detection of a zonal underground target in mountain land by detecting a ridge position and correcting energy at the ridge position.

Ridge position detection belongs to the field of terrain analysis, that is, the position of the ridge line is automatically extracted by using terrain information contained in terrain elevation data. A method of extracting the ridge line from three-dimensional elevation data can be classified into local algorithm and overall algorithm in principle. In the local algorithm, vertical and cross sections that form digital elevation grids are analyzed to find a point with a maximum elevation value on the cross section, and the found point is used as a ridge line candidate point; and then obtained candidate points are screened and sorted according to a certain rule, to obtain a required ridge line, where the cross section analysis method is a typical local algorithm. The overall algorithm is to simulate the state of natural running water on the terrain surface, to find a watershed. However, in the local algorithm, the overall change rule of the terrain cannot be estimated, and it is difficult to distinguish terrain noise when a ridge line is determined; therefore, the extracted ridge line candidate points have a lot of noise, which causes inconvenience to subsequent ridge line distinguishing, and even produces errors and makes it impossible to carry out subsequent algorithms. The overall algorithm has strong noise resistance, but requires a large amount of calculation, and the amount of calculation increases quadratically as the number of the digital elevation grids increases.

The focus of the present invention is to achieve objectives of reducing a false alarm rate in zonal underground target detection and improving a recognition rate by detecting a ridge position and correcting energy at the ridge position. The present invention provides a ridge detection method with a small calculation amount and a high calculation speed, and on this basis, illustrates a ridge heat radiation correction method, thereby achieving the objective of accurately detecting and positioning a zonal underground target by using a blurred Gaussian-like pulse mode (positive or negative).

Figure 1:
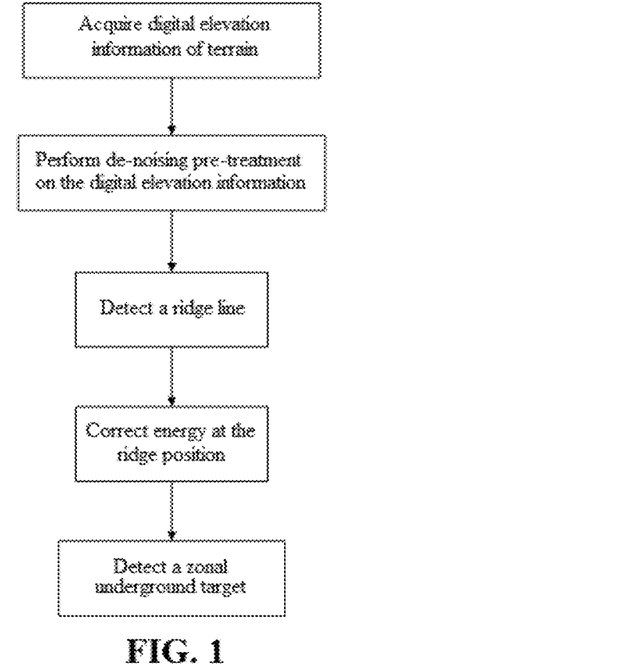
FIG. 1 is a schematic flow chart of a method for detecting a zonal underground target in mountain land based on ridge heat radiation correction according to the present invention.

The present invention provides a method for detecting a zonal underground target in a mountain land environment based on ridge heat radiation correction. As shown in FIG. 1, the method mainly includes five steps of: (1) acquiring digital elevation information of terrain; (2) performing de-noising pretreatment on the digital elevation information; (3) detecting a ridge line; (4) correcting energy at the ridge position; and (5) detecting the zonal underground target, to illustrate an execution process of algorithms thereof in detail:

(1) acquiring digital elevation information of terrain, including sub-steps of:

(1.1) determining the longitudes and latitudes of coverage of the digital elevation information:

The foregoing tunnel used as an example for description has a length of 3000 meters. To cover the entire zonal underground target while considering that the complexity of acquiring the digital elevation information of the terrain by using Google Earth is in direct proportion to the area of a selected region, we finally determine the size of a region to be detected, and after looking up related data, we determine the position of the region to be detected.

Figure 2:
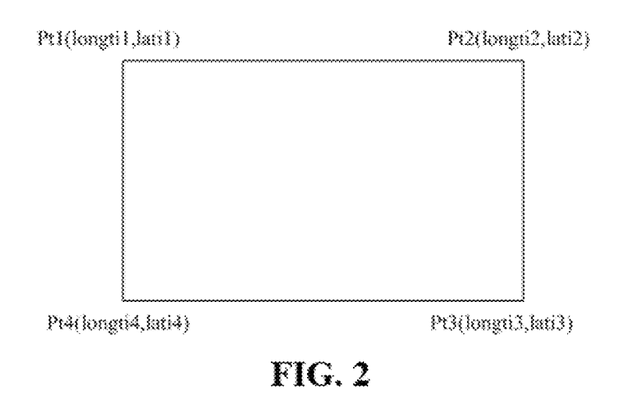
FIG. 2 is a schematic view of coverage of digital elevation information of terrain in an embodiment of the present invention.

The specific position of the region to be detected, that is, longitude and latitude information of four vertices P1, P2, P3, and P4 of the region to be detected is as follows:

Pt1 (116.150049, 40.296833), Pt2 (116.0292983, 40.356959),

Pt3 (116.194775, 40.260787), Pt4 (115.970548, 40.311917); a specific method for marking the four vertices is as shown in FIG. 2.

(1.2) calculating a longitude-latitude array in the coverage:

The energy (infrared) image used in an example for illustration in the present invention is obtained through simulation according to the infrared radiation characteristics, and the resolution of the image is 10 meters. The resolution of the longitude-latitude array needs to be the same as that of the energy (infrared) image, and therefore, a sampling interval step of the longitude-latitude array herein is 10 meters.

(1.2.1) calculating the width and height of the range of the terrain to be detected:

calculating, according to the longitudes and latitudes of the four vertices Pt1, Pt2, Pt3, and Pt4 of the rectangle determined in (1.1), the width and height of the rectangular coverage by using a distance measuring tool provided by Google Earth, where width=3800 meters, and height=4000 meters.

(1.2.2) calculating a longitude-latitude array:

sampling at intervals of 10 meters according to a sampling interval, to respectively calculate the number of sampling points along the vertical direction (latitudinal direction):

$$\text{lati\_num}=\text{height/step}=4000/10=400, \text{ and}$$

the number of sampling points along the horizontal direction (longitudinal direction):

$$\text{long\_num}=\text{width/step}=3800/10=380.$$

and calculate a longitude range:

$$\begin{aligned}\text{long\_region} &= longti2 - longti4 \\ &= 116.0292983 - 115.970548 \\ &= 0.0587503;\end{aligned}$$

and a latitude range $$\begin{aligned}\text{lati\_region} &= lati2 - lati4 \\ &= 40.356959 - 40.311917 \\ &= 0.045042;\end{aligned}$$

in the longitude-latitude array, a longitude step between every two neighboring sampling points $$\begin{aligned}\text{long\_step} &= \text{long\_region/long\_num} \\ &= 0.0587503/380 \\ &= 0.0001546;\end{aligned}$$

and
a latitude step $$\begin{aligned}\text{lati\_step} &= \text{lati\_region/lati\_num} \\ &= 0.045042/400 \\ &= 0.000112605\end{aligned}$$

In this case, the longitude of a sampling point in the $i^{th}$ row, $j^{th}$ column of the longitude-latitude array locate is:

$$\text{locate}(i,j)\_\text{longt1}=\text{longti4}+\text{long\_step}*j;$$

the latitude of the sampling point in the $i^{th}$ row, $j^{th}$ column of the longitude-latitude array is:

$$\text{locate}(i,j)\_\text{lati}=\text{lati4}+\text{lati\_step}*(\text{lati\_num}-i)$$

then, the longitude and latitude of the sampling point in the i$^{th}$ row, j$^{th}$ column of the longitude-latitude array is:

locate(i,j)(locate(i,j)_longti,locate(i,j)_lati).

Figure 3:
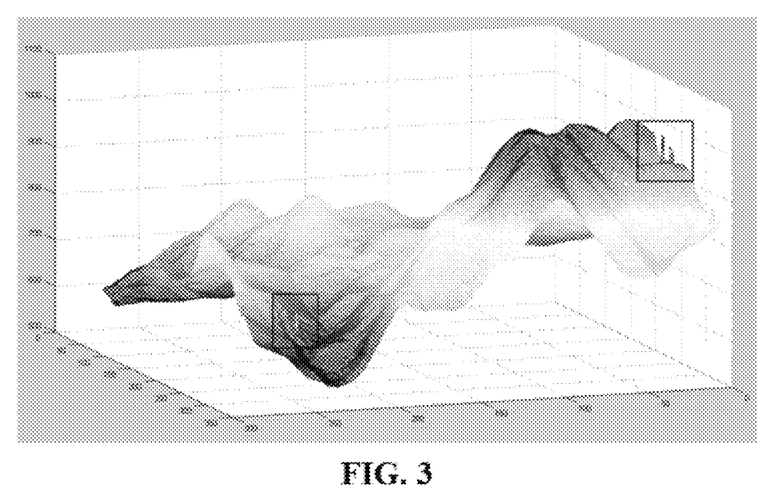
FIG. 3 is a view of digital elevation information of terrain acquired in an embodiment of the present invention.

(1.3) calculating an elevation array by using Google Earth:

Google Earth provides a programming interface. Coordinates of each the sampling point in the longitude-latitude array locate in (1.2.2) are arranged to form a vector row by row, that is, the (i+1)$^{th}$ row of locate is arranged after the i$^{th}$ row to form a vector that is used as an input. Google Earth automatically reads longitude and latitude data of each sampling point in sequence, and returns elevation data corresponding to each sampling point. We only need to output the returned elevation data vectors again in a form of an array that includes a total of lati_num rows, where each row includes long_num sampling points. This array is the digital elevation information of the terrain. The digital elevation information of the terrain in this embodiment is shown in FIG. 3.

(2) performing de-noising pretreatment on the digital elevation information, including sub-steps as below:

Because the digital elevation information array obtained in (1.3) has certain noise, as shown in the area marked by the black rectangular frame in FIG. 2, and the noise may be caused by inaccurate elevation data. Therefore, to eliminate the noise, de-noising pretreatment is performed on the original digital elevation information of the terrain by using a mean filtering method. That is, the entire image is traversed, and the value of each sampling point is replaced with a mean value of elevation information in a certain local area, for example, in an s*s neighborhood. In this way, the influence of the randomly distributed noise can be eliminated.

Illustration of the de-noising pretreatment algorithm: Assuming that an actual elevation value of the i$^{th}$ sampling point in a neighborhood is $h_i$, a noise error thereof is $\Delta h_i$, and a finally observed value is $h_i+\Delta h_i$, and a process of using a mean value of pixels in a neighborhood as an output is as follows:

$$\frac{1}{n}\sum_{i=1}^{n}(h_i+\Delta h_i)=\frac{1}{n}\sum_{i=1}^{n}h_i+\frac{1}{n}\sum_{i=1}^{n}\Delta h_i$$

$$\approx \frac{1}{n}\sum_{i=1}^{n}h_i$$

That is, because the noise is randomly distributed, average noise of multiple sampling points is 0, and in this way, an elevation map that approximates an actual condition can be obtained. In this embodiment, n=9, that is, s=3.

Figure 4:
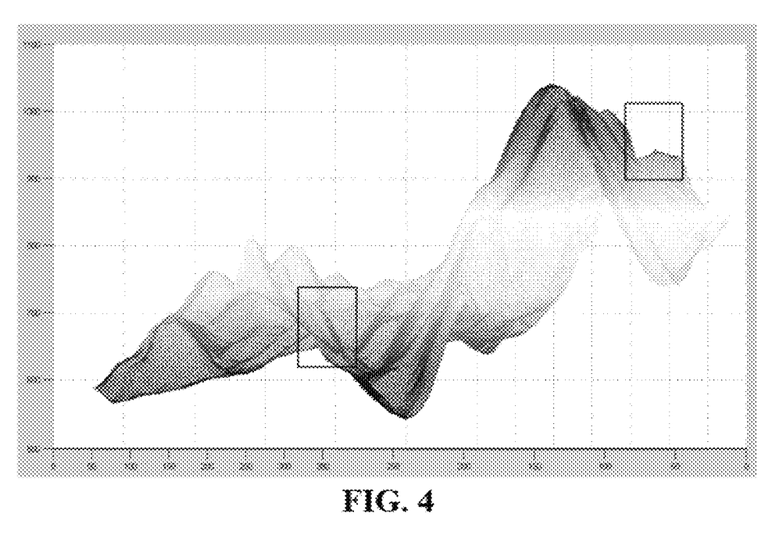
FIG. 4 is a view showing a result after de-noising pre-treatment is performed on the digital elevation information of the terrain in an embodiment of the present invention.

The result obtained after the de-noising pretreatment is performed on the digital elevation information is as shown in FIG. 4, where the noise in the area marked by the black frame is eliminated.

Figure 5:
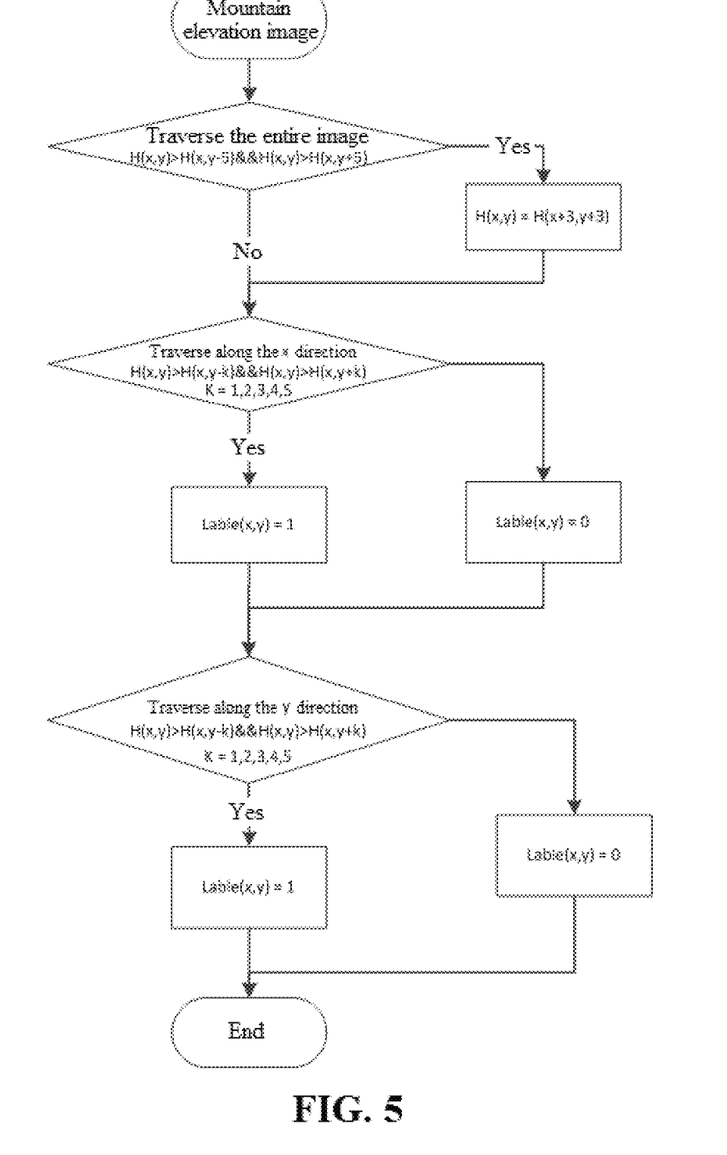
FIG. 5 is a flow chart of a ridge line preliminary detection algorithm in an embodiment of the present invention.

(3) detecting a ridge line, including sub-steps as below:

An overall flow chart of a ridge line preliminary detection algorithm is shown in FIG. 5, which is specifically divided into two sub-steps: (3.1) detecting a ridge line along the horizontal direction and (3.2) detecting a ridge line along the vertical direction. After the preliminary ridge line detection, elimination of a continuous ridge line (3.3) further needs to be performed.

(3.1) detecting a ridge line along the horizontal direction:

traversing the terrain digital elevation array row by row along the horizontal direction, to compare an elevation value H (x, y) of each sampling point with elevation values of sampling points in a certain range (for example, in a range of 5 sampling points, that is, 50 meters) in the y direction, where if the sampling point has a maximum value in the y direction, that is:

$H(x,y)>H(x,y-5)$, $H(x,y)>H(x,y-4)$, $H(x,y)>H(x,y-3)$, $H(x,y)>H(x,y-2)$, $H(x,y)>H(x,y-1)$, $H(x,y)>H(x,y+1)$, $H(x,y)>H(x,y+2)$, $H(x,y)>H(x,y+3)$, $H(x,y)>H(x,y+4)$, $H(x,y)>H(x,y+5)$, when the eight inequalities are all true, it is considered that the point is a ridge line candidate point in the horizontal direction, and in a ridge candidate point label array label, the point is set as label(x, y)=1; otherwise, the point is set as label(x, y)=0, indicating that the point is not a ridge line candidate point.

(3.2) detecting a ridge line along the horizontal direction:

traversing column by column along the vertical direction, to compare an elevation value of each sampling point with elevation values of sampling points in a certain range (for example, in a range of 5 sampling points, that is, 50 meters) in the x direction, where if the sampling point has a maximum value in the x direction, that is:

$H(x,y)>H(x-1,y)$, $H(x,y)>H(x-2,y)$, $H(x,y)>H(x-3,y)$, $H(x,y)>H(x-4,y)$, $H(x,y)>H(x-5,y)$, $H(x,y)>H(x+1,y)$, $H(x,y)>H(x+2,y)$, $H(x,y)>H(x+3,y)$, $H(x,y)>H(x+4,y)$, $H(x,y)>H(x+5,y)$, when the eight inequalities are all true, it is considered that the point is a ridge line candidate point in the vertical direction, and in the ridge candidate point label array label, the point is set as label(x, y)=1; otherwise, the point is set as label(x, y)=0, indicating that the point is not a ridge line candidate point.

Figure 6:
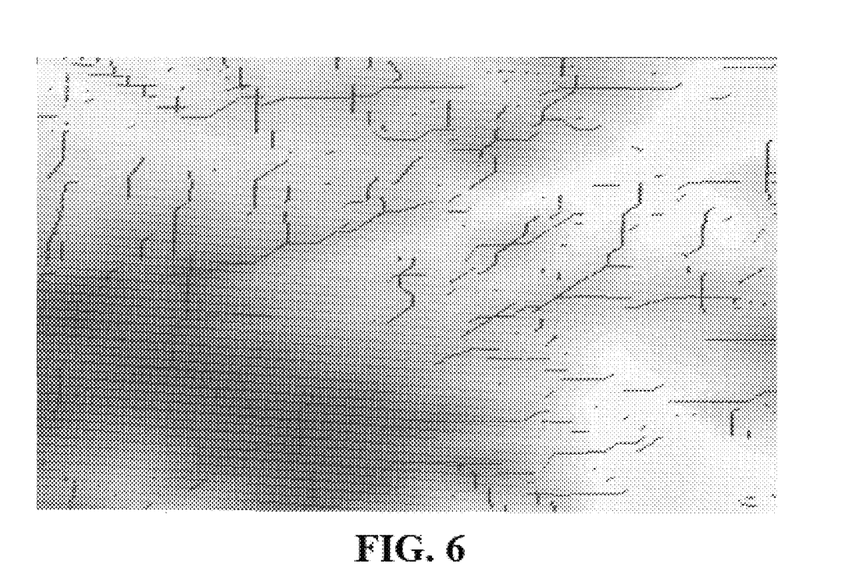
FIG. 6 is a view showing a result of rigid line preliminary detection in an embodiment of the present invention.

A result of ridge line preliminary detection marked on the view of the digital elevation information of the terrain, which is obtained after (3.1) and (3.2), is shown in FIG. 6.

Figure 7:
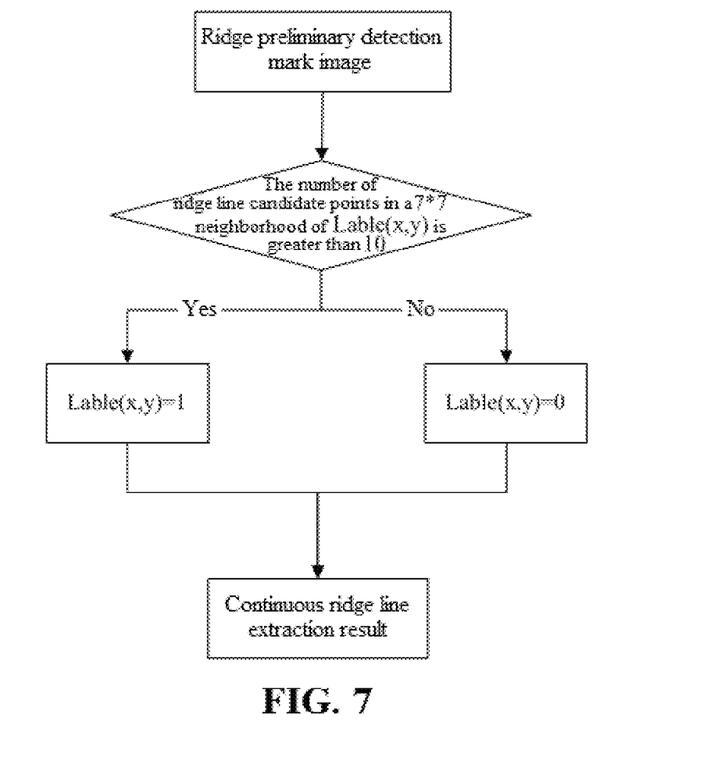
FIG. 7 is a flow chart of a continuous ridge line extraction algorithm in an embodiment of the present invention.

(3.3) extracting a continuous ridge line:

Because the ridge line candidate points extracted according to steps (3.1) and (3.2) have false alarms, a continuous ridge line extraction algorithm is provided, where a flow chart of the algorithm is shown in FIG. 7. For each ridge line candidate point in the ridge line preliminary detection result, it is determined whether the ridge line candidate point is a discontinuous isolate point or whether the number of ridge line candidate points in a certain region (for example, in a t*t neighborhood) of the ridge line candidate point is less than a certain threshold th_num, and if yes, it is determined that the ridge line candidate point is a non-ridge line point, to prevent false alarms.

Figure 8:
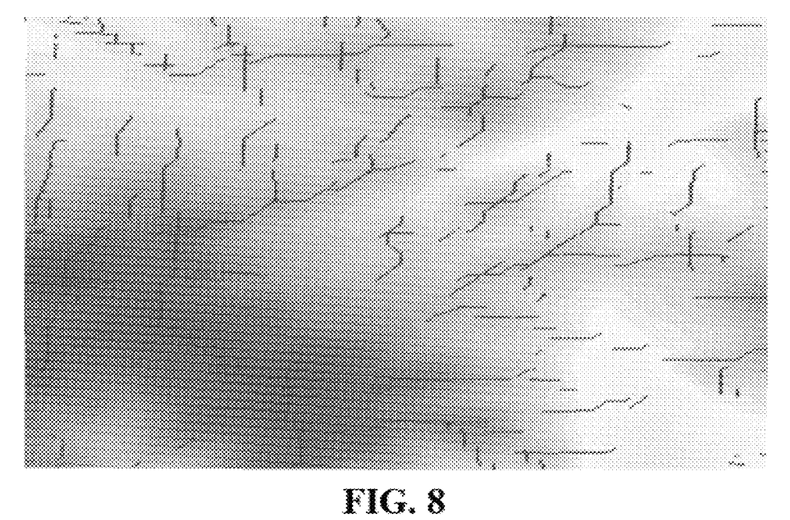
FIG. 8 is a view showing a result of continuous ridge line extraction in an embodiment of the present invention.

In this embodiment, assuming that t=7 and th_num=10, that is, if the total number of ridge line candidate points in a 7*7 neighborhood of the ridge line candidate point is greater than 10, it is considered that the ridge line candidate point is a ridge line point; otherwise, it is considered that the ridge line candidate point is a non-ridge line point. A result of continuous ridge line extraction marked on the view of the digital elevation information of the terrain is shown in FIG. 8.

Figure 9:
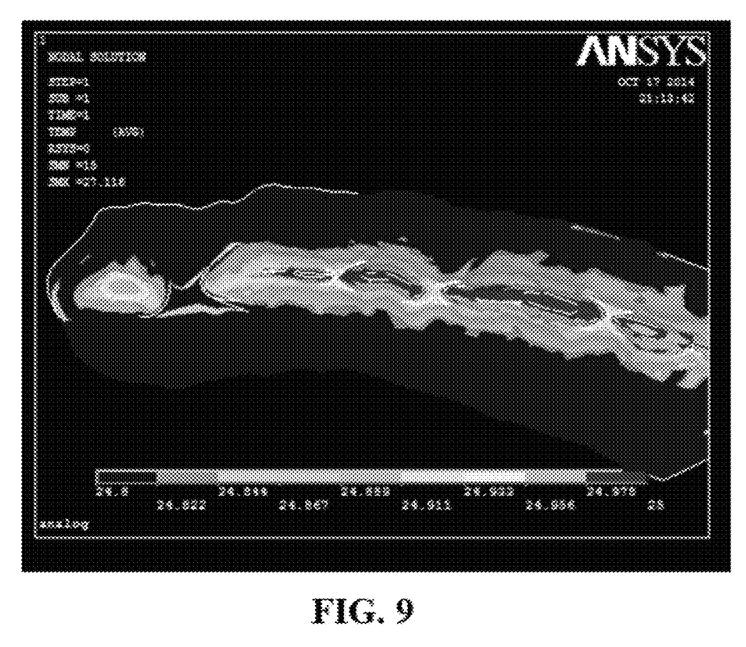
FIG. 9 is a view showing a simulation result of temperature field of a mountain mass in which no zonal underground target is located in an embodiment of the present invention.

(4) correcting energy at the ridge position, including sub-steps of:

(4.1) analyzing an energy distribution feature at the ridge position:

Generally, the ridge position has a mountain mass effect: the temperature at the ridge position is higher than the temperature at the mountainside, which is proved herein by using a simulation result of temperature field of a mountain mass in which no zonal underground target is located, as shown in FIG. 9. It can be seen that the temperature at the ridge position at the center of the mountain mass is higher than the temperature at the mountainside on two sides.

This phenomenon can also be analyzed from the perspective of the heat transfer theory: Data shows that the heat conductivity of rocks in the mountain mass is 1.2 to 2.1 W/(m·° C.), while the heat conductivity of external air in contact with the surface of the mountain mass is 0.024 W/(m·° C.). Heat always travels along the direction in which conduction occurs most readily. Therefore, when heat inside the mountain mass meets air, as the heat conductivity of the air is far less than the heat conductivity between rocks, most of the heat travels along the rocks and gathers at the ridge, resulting in the phenomenon that the temperature at the ridge is relatively high.

Figure 10:
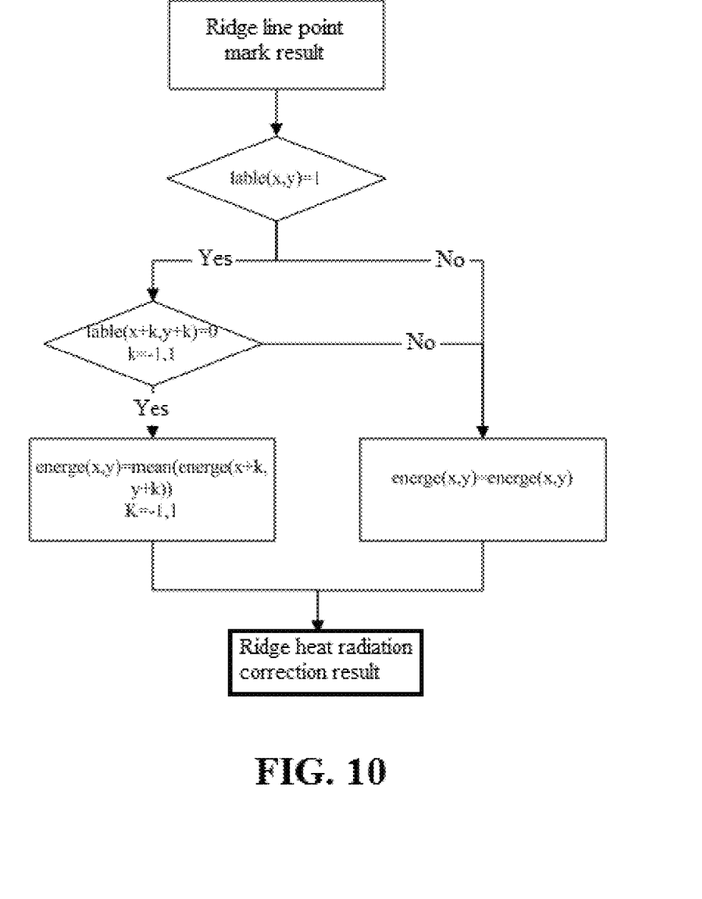
FIG. 10 is a flow chart of a ridge heat radiation correction algorithm in an embodiment of the present invention.
Figure 11:
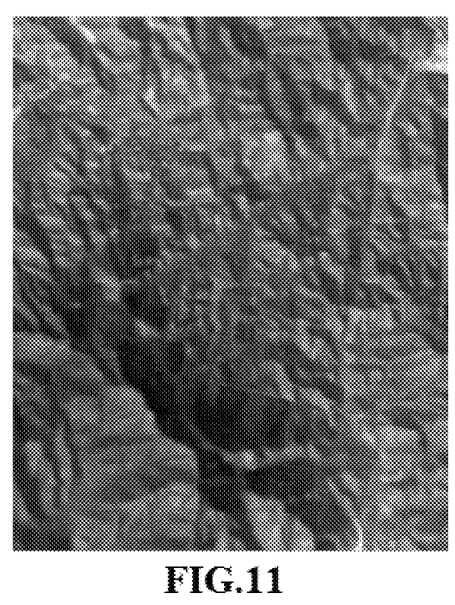
FIG. 11 is an original infrared image obtained through simulation in an embodiment of the present invention.
Figure 12:
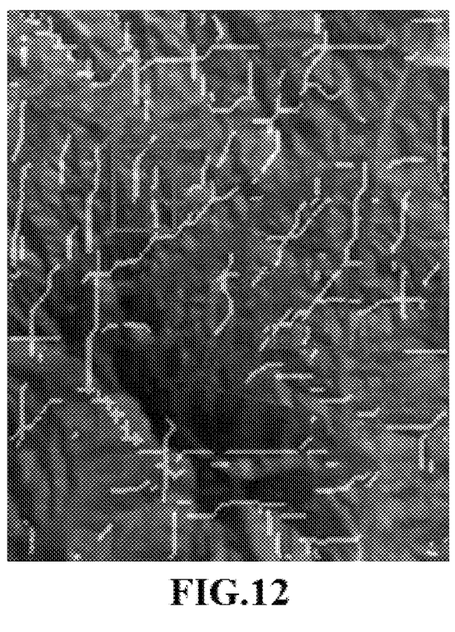
FIG. 12 illustrates results of marking ridge positions on a simulated infrared image in an embodiment of the present invention.
Figure 13:
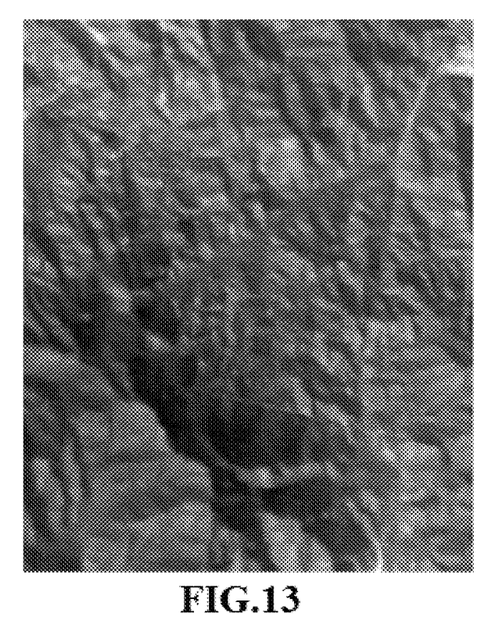
FIG. 13 is a view showing a result of ridge heat radiation correction in an embodiment of the present invention.

(4.2) correcting energy at the ridge position:

correcting energy at the ridge line position by means of nearest-neighbor interpolation, where a flow chart of an algorithm thereof is shown in FIG. 10, which mainly includes steps of:

1. traversing to find ridge line points.
2. finding, for each ridge line point label(x, y), non-ridge line points in four neighborhoods thereof, that is, points whose value is 0 in label(x−1, y), label(x+1, y), label(x, y−1), and label(x, y+1).
3. calculating a mean value of energy corresponding to the non-ridge line points in the four neighborhoods of the ridge line point label(x, y).
4. replacing energy of the ridge line point with the mean value of the energy corresponding to the non-ridge line points in the four neighborhoods, and finally obtaining an result after the ridge heat radiation correction. A simulated infrared image (energy image) without energy correction is shown in FIG. 11. FIG. 12 shows a result in which the detected ridge positions are marked on the simulated infrared image. An infrared simulated image after energy correction at the ridge line position is shown in FIG. 13. By comparing FIG. 11 and FIG. 13, the brightness of many bright positions is significantly reduced, and the purpose of correcting energy at the ridge position is achieved. The possibility of false alarms at these positions during zonal underground target detection and recognition in step (5) will be reduced.

Figure 14:
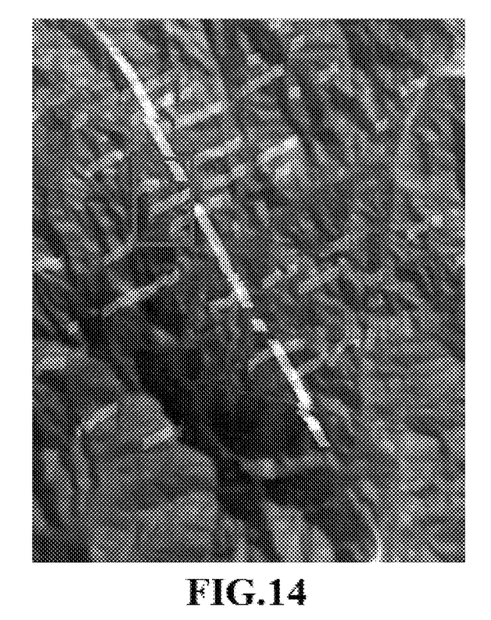
FIG. 14 is a view with detection false alarm marks before ridge heat radiation correction in an embodiment of the present invention.
Figure 15:
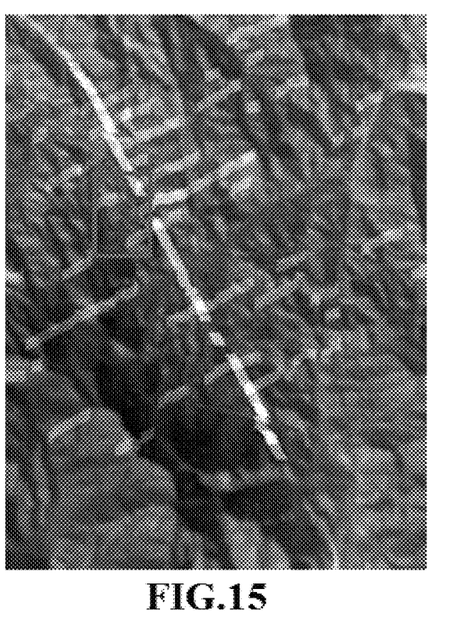
FIG. 15 is a view with detection false alarm marks after ridge heat radiation correction in an embodiment of the present invention.

(5) detecting the zonal underground target, including sub-steps of:

(5.1) setting parameters used for detecting, by means of traversing, the zonal underground target:

the length and width of a sampling section: l=25 and w=3;

a distance from centers of sampling sections on mountain land surfaces on two sides to the center of a sampling section above the tunnel: s=3 pixels;

search direction: approximately 120°, and central head and tail coordinates for traversing and searching: P0 (10, 27) and P1 (283,171);

distance for extension each time: d=13;

distance of left and right shifting for detection: r=3; and pulse threshold: th=3; and (5.2) outputting a traversing and detection result:

detecting the infrared simulated images before and after correction by using the parameters set in (5.1) for detecting the zonal underground target, to obtain false alarm marks. As shown in FIG. 14 and FIG. 15, the false alarm rate decreases from 24.7% to 21%. As for the ridge position marked by the frame in FIG. 12, false alarms in FIG. 14 in which energy at the ridge is corrected are reduced compared with FIG. 3 in which energy at the ridge is not corrected.

The invention claimed is:

1. A method for detecting a zonal underground target in mountain land based on ridge heat radiation correction, the method comprising:

receiving an infrared energy image of terrain, the infrared energy image including the zonal underground target in mountain land;

acquiring digital elevation information of terrain, comprising:
determining longitudes and latitudes of coverage of the digital elevation information;
calculating a longitude-latitude array in the coverage of the digital elevation information according to the longitudes and latitudes; and
calculating the elevation of each point in the longitude-latitude array according to the longitude-latitude array, to obtain a digital elevation information array;

performing de-noising pretreatment on the digital elevation information array as obtained in the acquiring digital elevation information of terrain;

detecting a ridge line according to the digital elevation information array on which the de-noising treatment has been performed, comprising:
detecting a ridge line along a horizontal direction;
detecting a ridge line along a vertical direction; and
extracting a continuous ridge line according to the ridge line detected along the horizontal direction and the ridge line detected along the vertical direction;

determining an energy correction at a ridge position according to an energy distribution feature at the ridge position, and correcting the infrared energy image based on the energy correction as determined, the ridge position being determined based on the continuous ridge line as extracted; and detecting the zonal underground target in the digital elevation information array, comprising:

setting parameters used for detecting, by means of traversing, the zonal underground target; and traversing the digital elevation information array according to the parameters to detect the zonal underground target, and outputting the position of the detected zonal underground target.

2. The method of claim 1, wherein the calculating the longitude-latitude array in the coverage of the digital elevation information according to the longitudes and latitudes includes:

calculating the width and height of a terrain range:
calculating, according to the longitudes and latitudes as determined of four vertices of a rectangle, the width and height of the rectangular coverage by using a distance measuring tool, the calculated width and height being marked as width and height in meters, and calculating the range of the longitudes and latitudes;

calculating the longitude-latitude array:
sampling at intervals of step meters according to a sampling interval of step meters, to respectively calculate the number of sampling points in the vertical direction and the number of sampling points in the horizontal direction, that is: height/step and width/step, and calculating a longitude step long_step and a latitude step lati_step between every two neighboring sampling points in the longitude-latitude array, thereby calculating the longitude and latitude of each sampling point in the longitude-latitude array.

3. The method of claim 1, wherein the calculating the elevation of each point in the longitude-latitude array according to the longitude-latitude array, to obtain the digital elevation information array includes:

inputting the longitude-latitude array as calculated to obtain elevation data of each sampling point, and generating the digital elevation information array of the terrain according to the elevation data and outputting the digital elevation information array of the terrain.

4. The method of claim 1, wherein the performing de-noising pretreatment on the digital elevation information array obtained in the acquiring digital elevation information of terrain includes:

performing de-noising pretreatment on the digital elevation information by using a mean filtering method.

5. The method of claim 1, wherein the detecting the ridge line along the horizontal direction includes:

traversing along an x direction, to compare an elevation value of each sampling point with elevation values of sampling points in a preset range in a y direction, wherein if the sampling point has a maximum value in the y direction, the point is a candidate point of the ridge line along the horizontal direction.

6. The method of claim 1, wherein the detecting the ridge line along the vertical direction includes:

traversing along a y direction, to compare an elevation value of each sampling point with elevation values of sampling points in a preset range in an x direction, wherein if the sampling point has a maximum value in the x direction, the point is a candidate point of the ridge line along the vertical direction.

7. The method of claim 1, wherein the extracting the continuous ridge line according to the ridge line detected along the horizontal direction and the ridge line detected along the vertical direction includes:

determining the continuity of each ridge line candidate point as extracted, wherein a criterion for the determining is as follows: if there are different ridge line candidate points in a region defined by t in an x-direction and by t in a y direction from the ridge line candidate point, the ridge line candidate point is a final ridge line point; otherwise, it is judged that the isolate ridge line candidate point is a non-ridge line point, to finally obtain a continuous ridge line mark map, wherein t is a preset value.

8. The method of claim 1, wherein the correcting energy at the ridge position: correcting energy at the ridge position according to an energy distribution feature at the ridge position includes:

correcting energy at the ridge position, and a specific correction method is: replacing energy of a sampling point on the ridge line with a mean value of energy of sampling points on two sides of the ridge line.

9. The method of claim 1, wherein the parameters set in the setting parameters used for detecting, by means of traversing, the zonal underground target include:

size of a sampling section and spacing from a comparison section to a central section: suppose that a sampling section of a mountain land surface under which the zonal underground target is assumed to exist has a length of z pixels and a width of z pixels; sampling sections of mountain land surfaces on two sides of the zonal underground target also have a length of z pixels and a width of z pixels; and a distance from the center of either of the sampling sections of the mountain land surfaces on two sides to the center of the sampling section above the zonal underground target is s pixels, wherein z and s are preset values;

search direction: estimating the direction of the zonal underground target in this region, and setting, according to degree of the estimated direction, central head and tail coordinates P0 (x0, y0) and P1 (x1, y1) for traversing and searching, wherein a line connecting the two points passes through a position near the midpoint of this region;

distance for extension each time: each time after searching one group of images of the mountain land surface under which the zonal underground target is assumed to exist and mountain land surfaces on two sides of the zonal underground target, shifting a distance of d towards two sides to continue to search a new group, wherein searching is stopped automatically when image boundaries are reached; and pulse threshold: only when absolute values of differences between an average gray value of each image sampling section, in the middle, of the mountain land surface under which the zonal underground target is assumed to exist and average gray values of image sampling sections of the mountain land surfaces on two sides of the zonal underground target are both greater than the pulse threshold th, a pulse at this position is counted as a valid pulse; and if either of the two differences is less than the pulse threshold, the pulse at this position is considered invalid due to a weak signal.

10. The method of claim 1, wherein the traversing the digital elevation information array according to the parameters to detect the zonal underground target, and outputting the position of the detected zonal underground target includes:

moving the sampling section pixel by pixel from the point P0 (x0, y0) to the point P1 (x1,y1) starting from the central head and tail coordinates P0 (x0, y0) and P1 (x1, y1) for traversing and searching determined in (5.1), and each time after the sampling section is moved by one pixel, shifting to the left and right by r pixels respectively, wherein r is a preset value, finding a position at which the middle section has a maximum difference with the comparison sections on the left and right, and testing whether a pulse at this position is a valid pulse; if the pulse is a valid pulse, increasing the number of valid pulses by one; then calculating coordinates P0' and P1' that are obtained after P0 and P1 are shifted by the distance for extension each time towards two sides, using a sampling method the same as that used between P0 and P1 to generate statistics between P0' and P1', and counting the number of valid pulses, wherein a position determined by a group of terminal coordinates P0 and P1, between which the number of valid pulses accounts for a largest proportion in the total number of pulses, is the position of the zonal underground target, and in the result, other positions where pulses appear are false alarm positions.

* * * * *